United States Patent [19]

Cline et al.

[11] Patent Number: 4,654,945
[45] Date of Patent: Apr. 7, 1987

[54] METHOD FOR A COMPACT CONVERSION AIR-ACTUATED DRIVE UNIT

[75] Inventors: David M. Cline, Greenville; William R. Branyon, Landrum; Norman E. Voelzow, Greenville, all of S.C.

[73] Assignee: The Cline Company, Greenville, S.C.

[21] Appl. No.: 791,925

[22] Filed: Oct. 28, 1985

[51] Int. Cl.⁴ .................. B23P 17/04; B23P 11/00
[52] U.S. Cl. ..................................... 29/401.1; 29/428; 29/469
[58] Field of Search ............ 29/401.1, 469, 428; 74/572; 192/85 A, 85 AA

[56] References Cited

U.S. PATENT DOCUMENTS

| | | | |
|---|---|---|---|
| 3,186,081 | 6/1965 | Barisch | 29/469 |
| 3,382,735 | 5/1968 | Gatiss | 29/401.1 |
| 3,796,514 | 3/1974 | Du Frene | 192/85 A |

Primary Examiner—Howard N. Goldberg
Assistant Examiner—Irene Graves-Golabi

Attorney, Agent, or Firm—Cort Flint

[57] ABSTRACT

A method is disclosed for converting a mechanically-actuated drive unit to an air-actuated drive unit (18) in an industrial power transmission system of the type having a short-shaft motorized input drive employing an input shaft (16) releasably connected to an output shaft (20) by the drive unit. A spider (14, 42) having a hub (50) is affixed to the input shaft. The drive unit has an input member (86) connected to a radial flange (68) of the spider and an output member (92) connected to the output shaft. The drive unit includes an actuator member (88) for releasing and connecting the input and output members. In the method, the mechanically-actuated drive unit is replaced with the air-actuated drive unit. A diameter of the spider hub is reduced and a rotary air seal adaptor (12) is affixed directly onto the reduced diameter spider hub. The rotary air seal adaptor has a stationary air chamber member (28) for receiving air from an external air supply source and an air chamber passageway (28a) for carrying said air.

9 Claims, 3 Drawing Figures

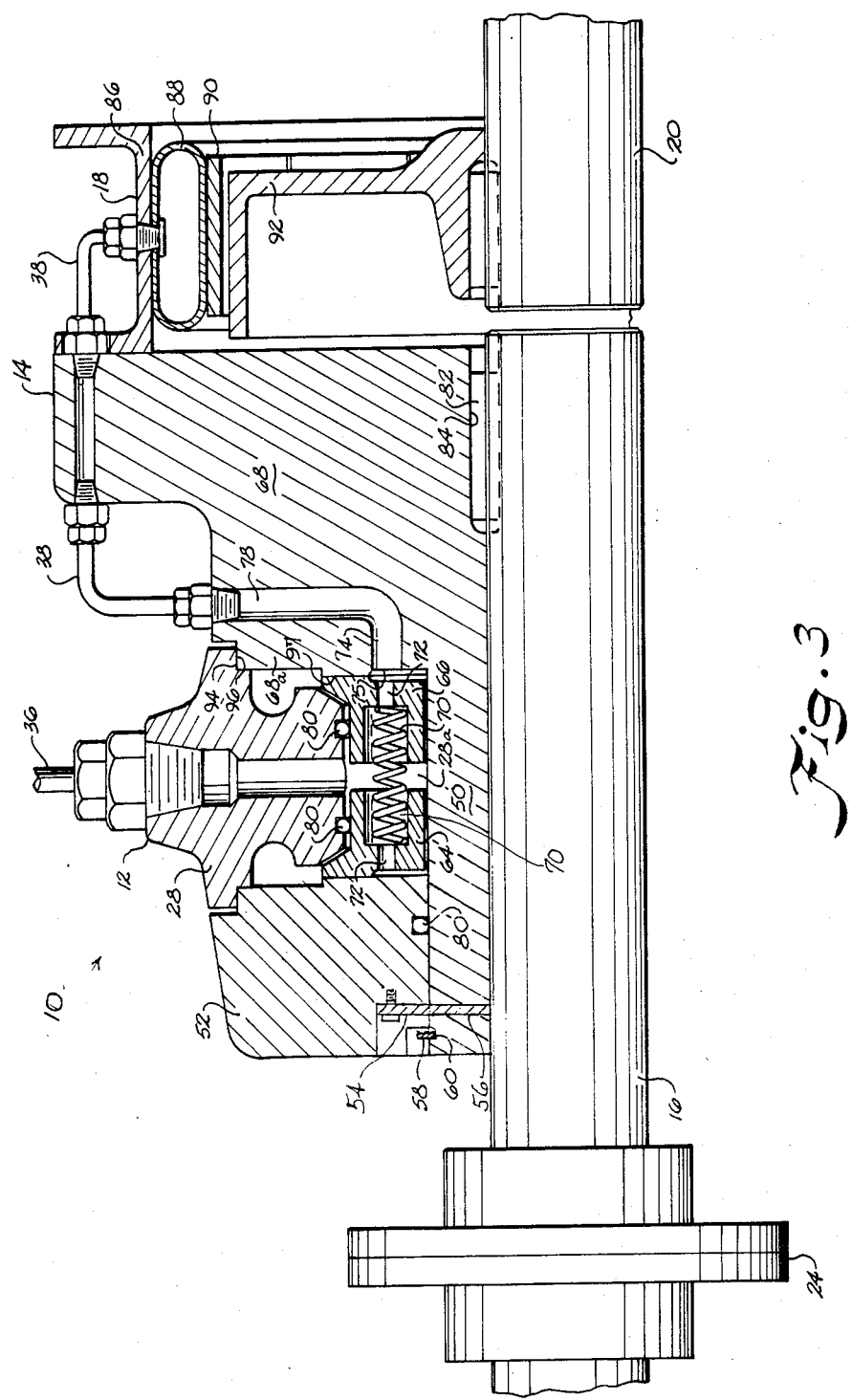

METHOD FOR A COMPACT CONVERSION AIR-ACTUATED DRIVE UNIT

BACKGROUND OF THE INVENTION

The invention relates to an air-actuated drive unit used to transmit rotative forces from an input shaft to a rotatably mounted output shaft. In particular, the invention provides for the conversion of a mechanically-actuated drive unit to an air-actuated drive unit especially in those circumstances where there is a limited amount of space available on the input drive shaft.

Typically, when an air-actuated drive unit, such as a brake or clutch, is provided for an input/output drive shaft combination, a rotary air shaft seal, such as the Power Flo model 700 manufactured by the Carlson Company, Incorporated of Wichita, Kans., is mounted on the input drive shaft to receive air from a stationary air supply source. A spider member adapted for mounting the air-actuated drive unit is also fixed on the input drive shaft separate from the air-shaft seal and rotates with the input drive shaft. A drive unit is actuated by air which is delivered from the air shaft seal via a conduit which is external to the input drive shaft. Upon actuation of the drive unit, the output shaft will rotate at a rate relative to the rate of rotation of the input drive shaft.

In certain applications there is not enough space on the input drive shaft to allow both the rotary air shaft seal and the spider member to be mounted on the shaft. In such an application, the usual way to provide air to the drive unit is to rifle drill an axial bore and then drill a connecting transverse bore in the input drive shaft which allow air from an air supply source to communicate with the drive unit via a rotary union connected to the input shaft. The rifle drilling procedure is time-consuming, and serves to reduce the integrity of the input drive shaft. In industrial applications where large industrial drive transmissions are involved, long down-times such as six weeks are required in order to rifle drill the input shaft for routing of a suitable air supply. Accordingly, it will be desirable to provide a means for delivery of actuating air to an air-actuating drive unit which would not require the drilling of the input drive shaft.

Certain devices have been patented, such as those shown in U.S. Pat. No. 2,823,777 and U.S. Pat. No. 3,796,514, which provide for the supplying of a pressurized fluid from a stationary supply source to a rotating drive unit. However, these devices do not lend themselves to industrial applications where the problem of connecting two rotatably mounted shafts typically exists. The devices are complicated in their structure and designed for specialized usages.

Accordingly, an object of the present invention is to provide an air-actuated drive unit suitable for industrial applications which receives air from a stationary air supply source and by means external to an input drive shaft.

Another object of the present invention is to provide an air-actuated drive unit having a spider member which can be mounted in connection with an air shaft seal adaptor on an output drive shaft in a limited amount of space.

Still another important object of the present invention is to provide a method for converting a mechanically-actuated drive unit to an air-actuated drive unit.

Still another important object of the present invention is to provide a method for allowing an air-actuated drive unit to be mounted in a compact space on an input drive shaft of limited length.

SUMMARY OF THE INVENTION

The above objectives are accomplished according to the present invention by means of a compact air-actuated drive unit which can be mounted on an input drive shaft of limited length and which receives air from a stationary air supply source in a route which is external to the input drive shaft. In particular, the invention contemplates method and apparatus for converting a mechanically-actuated drive unit to an air-actuated drive unit. The apparatus includes a stationary air shaft seal or adaptor stationarily carried directly on the the spider member of the air-actuated drive unit. By providing the air shaft seal adaptor, the combined length of the air shaft seal adaptor and the spider member is such to allow the air-actuator drive unit to be used in industrial power transmission systems having short-shaft input drives whose drive shafts are of limited length.

The method includes removing the mechanically-actuated drive unit from both the input drive shaft and the output shaft and adapting an air shaft seal adaptor directly onto the spider in lieu of the input drive shaft. A hub on the spider member is machined to receive the air shaft seal adaptor so that it interfaces for smooth rotation relative to the air shaft seal adaptor. Passages are formed in the spider member for allowing air introduced into the air seal adaptor from a stationary air supply source to communicate with an actuator member of the drive unit. A seal ring having circumferentially spaced ports is provided at the interface between the air shaft seal adaptor and the spider member for simultaneously preventing external leakage of air and providing air passages through the ports as air is transferred from the air shaft seal adaptor to the spider member, and subsequently to the actuator of the drive unit.

BRIEF DESCRIPTION OF THE DRAWINGS

The construction designed to carry out the invention will be hereinafter described, together with other features thereof.

The invention will be more readily understood from a reading of the following specification and reference to the accompanying drawings forming a part thereof, wherein an example of the invention is shown and wherein:

FIG. 3 is a partial longitudinal section view of apparatus and method for adapting and converting a mechanical drive unit to an air-actuated unit in accordance with the invention.

DESCRIPTION OF A PREFERRED EMBODIMENT

The invention relates to an air-actuated drive unit for transmitting rotational forces from a rotating input drive shaft to a rotably mounted output shaft. More particularly, the invention is directed to a compact air-actuated drive unit which can be mounted on an input drive shaft of limited length in the conversion of a mechanical-actuated drive unit.

Figure 1:
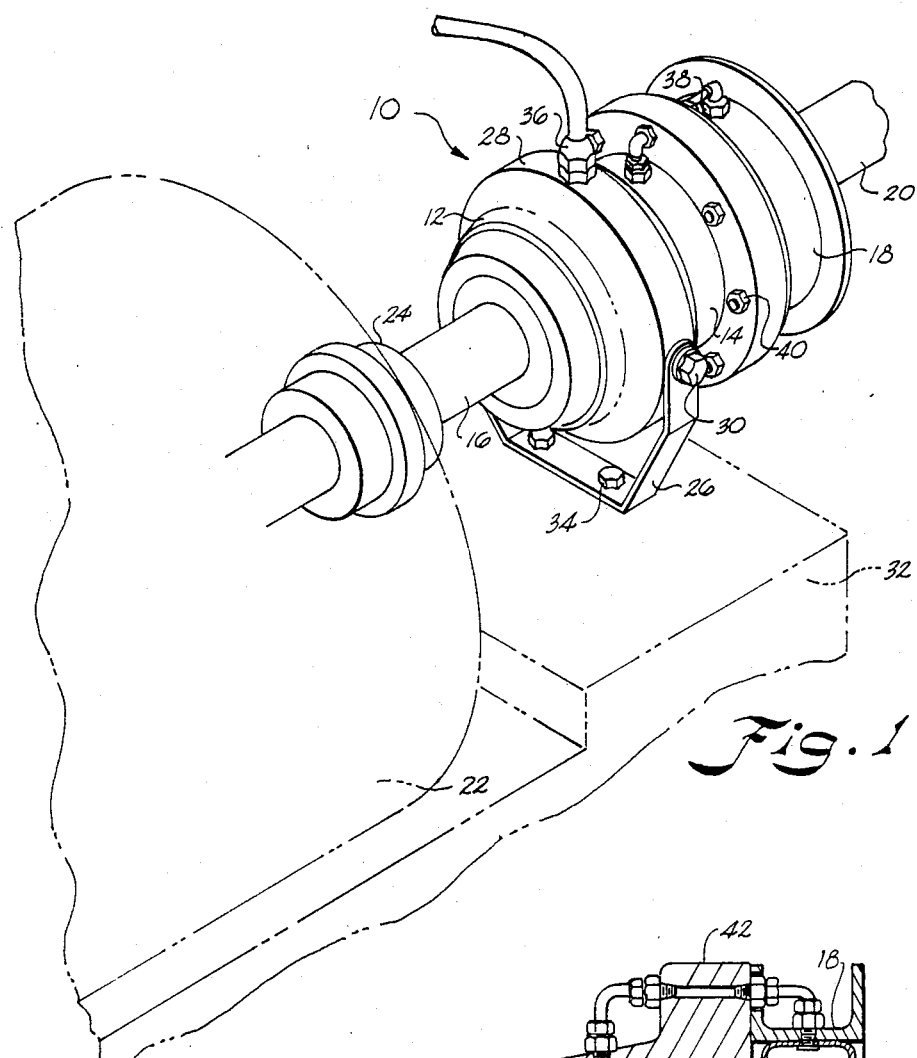
FIG. 1 is a perspective view of apparatus and method for adapting a mechanical drive unit to an air-actuated drive unit for releasably connecting an input drive shaft to an output drive shaft according to the invention.

Referring to the drawing, a converted, compact air-actuated drive unit generally at 10 is illustrated having an air shaft seal adaptor 12, mounted on a spider member 14 affixed to an input drive shaft 16, and an air-operated friction drive unit 18 mounted integral with the spider member 14 for rotation about an end of an output shaft 20. As shown in FIG. 1, a drive motor 22 having a shaft bearing 24 powers the input drive shaft 16 in a short-shaft industrial power transmission system. The air shaft seal adaptor 12 is held stationary by means of a bracket 26 which is attached to a stationary air chamber member 28 of the air shaft seal adaptor 12 by means of bolts 30. The bracket 26 is held stationary against a base member 32 by base member bolts 34. The air is delivered to the air shaft seal adaptor 12 from a stationary air supply source (not shown) by means of an air inlet 36 carried in the housing 28 of the air shaft seal adaptor 12.

The spider member 14 is mounted for rotation with the input drive shaft 16. Carried on the spider member 14 is an air conduit 38 which extends from the spider member 14 to the friction drive unit 18. An air conduit 38 allows air introduced into air inlet 36 to be transferred from the air shaft seal adaptor to the friction drive unit 18. The friction drive unit 18 is mounted for rotation with a spider member 14 by bolts 40. Upon air actuation of the friction drive unit 18, the output shaft 22 is caused to rotate with the input drive shaft 16.

Figure 2:
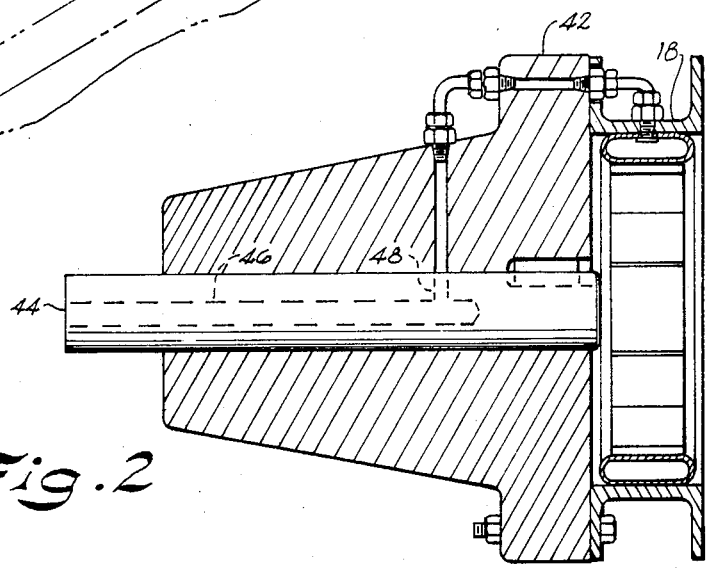
FIG. 2 is a longitudinal section of the prior art air-actuated drive unit mounted on an input drive shaft having rifle drilled air passages.

A prior art spider member 42 and air passage system 44 is shown in FIG. 2 illustrating a prior method of converting and adapting an air-actuated drive unit in an industrial power system. The air passage system 44 required that an axial passageway 46 be rifle drilled in the input shaft requiring that the system be disassembled and the shafts transported to a machine shop. A transverse passageway 48 is also drilled in the input drive shaft area. There is not sufficient axial space in a short-shaft industrial system for placement of a conventional rotary air shaft seal on the shaft itself necessitating the rifle drilling of the shaft. The drilling of the input drive shaft is not only time-consuming but it reduces the structural integrity of the input drive shaft.

Referring to FIG. 3, the compact air-actuator drive unit is illustrated in more detail. A spider hub 50 carried integral with the spider member 14 extends through the air shaft seal adaptor 12. The hub 50 terminates adjacent a rotary member 52 of the air shaft seal adaptor 12. The rotary member 52 is held against relative rotation with respect to spider hub 50 by means of a tab key 54 carried in a forward keyway 56. The hub 50 is held against axial movement with respect to the rotary member 52 by means of a snap-ring 58 carried in a circumferential groove 60 on the hub 50 which acts against a rotary member recess 62. The rotary member 52 rotates with the hub 50. The stationary air chamber 28a is sandwiched between the rotary member 52 and spider flange 68 by the snap ring 58 retaining the same in place.

Two carbon seal rings 64, 66, are carried in the stationary member 28 of the air shaft seal adaptor 12. Seal ring 64 is biased against the rotary member 52, and the seal ring 66 is biased against a radially extending vertical flange 68 of the spider member 14, by means of a plurality of circumferentially spaced coil springs 70. A plurality of air ports or perforations 72 is circumferentially spaced about the rim of each seal ring 64, 66. The ports 72 allow air-actuating air introduced into the chamber 28a of the stationary air chamber member 28 by way of the air inlet 36 to pass through the seal ring 66 and on in to a first axially extending air passageway 74. The seal rings 64, 66, prevent external leakage to the environment of air introduced into the housing 28.

An annular recess 75 in communication with the first passageway 74 is provided in the flange 68 of the spider member so that air introduced into the chamber 28a of the air shaft seal adaptor may communicate with the first passageway 74 at all times. A second transversely extending air passageway 78 is provided in spider member 14 and is connected to the first passageway 74. The second passageway 78 allows air to pass from the first passageway 74 into the air conduit 78, and consequently on into the friction drive unit 18. O-rings 80 further help prevent air inside the housing 28 from escaping to the environment. The spider member 14 is prevented from relative rotation with respect to the input drive shaft 16 by means of a key 82 provided in a forward keyway 84.

The air-operated friction drive unit 18 comprises an input member in the form of a shell 86 which carries an actuator member in the form of an integrally molded donut-shaped inflatable neoprene tube 88. The neoprene tube when inflated acts on friction blocks 90 to force them against an output member in the form of an external flange 92 which is keyed for rotation with the output shaft 20. Both the neoprene tube 88 and the friction blocks 90 encircle and are coaxial with the output shaft 20. Actuation of the friction drive unit 18 occurs when air is introduced into the air inlet 36 and results in the friction block 90 being forced against the external flange 92 to cause the output shaft 20 to rotate with the input shaft 16. A clutch/brake unit such as the friction drive unit 18 is manufactured by the Airflex Division of Eaton Corporation of Cleveland, Ohio, as the Airflex CB and VC clutch/brake unit.

The method of the present invention of converting a mechanically-actuated drive unit (not shown) to an air-actuated drive unit is accomplished by first removing the mechanically-actuated drive unit (not shown) from both spider flange 68 and output shaft 20. The stationary air supply source (not shown) is provided. The prior art spider hub as shown in FIG. 2 is machined so that its diameter is reduced to accept rotary member 52 and stationary chamber member 28 of rotary air seal adaptor 12. The air shaft seal adaptor 12 is placed on the reduced diameter spider hub 50. The machined spider hub may be inserted between the rotary air seal adaptor 12 and the input drive shaft 16. The circumferential groove 60 is cut into the hub 50 for carrying the snap-ring 58 adjacent the rotary member recess 62. A radial key slot is provided in the hub 50 for forming the forward keyway 56 upon in hub 50 being inserted into the air shaft seal adaptor 12.

A face 68a of radial spider flange 68 of the spider member is machined, preferably to a microfinish, to form a rotary interface surface 94 which rotates in close proximity with a rotary interface 96 carried on the housing 28. A surface 97 is also microfinished to provide a rotary interface which interfaces with carbon seal ring 66. First axial passageway 74 and radial connecting second passageway 78 are formed in vertical flange 68 of the spider member to provide an air passage from chamber 28a of the stationary chamber to air conduit 38, connected to the exit above second passageway 78. The annular recess 75 is machined into the flange 68 of the spider member which is in communication with the first passageway 74.

The air inlet 36 is provided in air shaft seal adaptor 12 and allows air to pass into the interior of the stationary air chamber housing 28.

Perforations 72 which are extensions of ports 70 are provided in the seal rings 64, 66, for allowing air to pass from the interior of the housing 28 into the annular recess 75 and the flange 68 of the spider member. Once the spider member has been properly machined and modified, it is assembled with the air shaft seal adaptor 12 on the input drive shaft 16.

The assembly of the spider member and the air shaft seal adaptor provides a compact means suitable for mounting on an input drive shaft of limited length which introduces air into a rotating friction unit by air passages which are external to the input drive shaft. Thus, the present invention provides a compact air-actuated drive unit which can be mounted on a relatively short input drive shaft without requiring an input drive shaft to have air passages drilled therein.

While a preferred embodiment of the invention has been described using specific terms, such description is for illustrative purposes only, and it is to be understood that changes and variations may be made without departing from the spirit or scope of the following claims.

What is claimed is:

1. A method of converting a mechanically-actuated drive unit to an air-actuated drive unit in an industrial power transmission system of the type having a rotating input drive shaft, a spider affixed to said input drive shaft so that said spider and input drive shaft rotate together, said mechanically-actuated drive unit adapted to be mounted to said spider so that said input drive shaft and said mechanically-actuated drive unit rotate together, an output shaft releasably connected to said mechanically-actuated drive unit in a manner in which said output shaft rotates with said input drive shaft when said mechanically-actuated drive unit is activated and released from said rotation with said input drive shaft when said mechanically-actuated drive unit is deactivated, said method comprising removing said mechanically-actuated drive unit from said spider and mounting said air-actuated drive unit on said spider in place of said mechanically-actuated drive unit, and supplying air from a stationary source to said air-actuated drive unit, wherein the improvement comprises:

providing a rotary air seal adaptor having a rotary member, and a stationary air chamber member;

providing a stationary air chamber member having an air chamber and an air inlet adapted to be connected to an external air supply source for delivery of air into said air chamber;

machining a hub of said spider for axially receiving said rotary air seal adaptor;

machining a radial flange of said spider to interface with said rotary air seal adaptor including machining a rotary interface surface for forming a rotating interface between said stationary air chamber member of said rotary air seal adapator and said radial flange of said spider;

forming a first air delivery passage in said spider in a direction substantially parallel to the axis of rotation of said input drive shaft;

forming a second air delivery passage in said spider in communication with said first passage;

connecting said second air delivery passage to an air actuator of said air-actuated drive unit with an air delivery conduit;

providing air distribution means connected between said stationary air chamber and said first air delivery passage for distributing air from said stationary air chamber to said air actuator;

sealing said rotary interface for preventing external air leakage from said air distribution means between said stationary chamber member and said spider flange as air passes from said stationary air inlet and chamber to said first passage; and assembling said rotary air seal adaptor directly onto said spider hub in a manner in which said stationary air chamber is held stationary while said radial spider flange rotates relative to said stationary air chamber member.

2. The method as set forth in claim 1 including affixing said rotary member of said rotary air seal adaptor to said spider hub in a manner in which said rotary member and said spider hub rotate together while said stationary air chamber member is sandwiched stationary between said rotary member and rotating vertical spider flange.

3. The method of claim 2 including machining a reduced diameter on said spider hub and arranging said rotary member and said stationary air chamber member of said rotary air seal adaptor on said reduced diameter of said spider hub with said stationary air chamber member interfacing with said machined radial flange of said spider hub.

4. The method as set forth in claim 2, including: machining a rearward key slot in a rotary member of said rotary air seal adaptor; machining a rearward key slot in said hub of said spider for acting in conjunction with said rearward key slot upon the assembling of said rotary air-seal adaptor upon said spider hub to form a rearward keyway: and providing a key in said rearward keyway to affix said rotary member of said rotary air seal adaptor and said spider together for unitary rotational movement.

5. The method as set forth in claim 1, including providing said rotary interface surface of said flange of said spider with a micro-finish during the machining of said flange of said spider.

6. The method as set forth in claim 1, including machining an annular recess in said radial flange of said spider communicating with said first passage and said stationary air chamber to form said air distribution means continuously about a circumference of said annular recess about said spider flange.

7. The method as set forth in claim 1, including machining a circumferential groove in said hub of said spider for accepting a fastening member for holding said hub of said spider against axial movement with respect to said rotary member of said rotary air seal adaptor.

8. The method of claim 6 including sealing between said stationary air chamber and spider flange by providing a sealing ring between said stationary air chamber and said annular recess, said seal ring having a plurality of circumferentially spaced air ports for the delivery of air from said station air chamber to annular recess.

9. A method of converting a mechanically-actuated drive unit to an air-actuated drive unit in an industrial power transmission system of the type having a short-shaft motorized input drive employing an input shaft releasably connected to an output shaft by said drive unit, a spider having a hub affixed to said input shaft, said drive unit having an input member connected to a radial flange of said spider and an output member connected to said output shaft, said drive unit including an actuator member for releasing and connecting said input and output members wherein said mechanically-actuated drive unit is replaced with said air-actuated drive unit and wherein said method comprises, reducing a diameter of said spider hub and affixing a rotary air seal adaptor directly onto said reduced diameter spider hub having a stationary air chamber member for receiving air from an external air supply source and an air chamber passageway for carrying said air, machining a rotary interface surface in said radial spider flange from interfacing with said stationary member to provide relative rotation between said stationary member of said rotary air seal adaptor and said spider flange; forming a spider passageway in said spider flange for carrying air to said actuator member of said drive unit; forming an annular recess in said spider flange communicating with said spider passageway and said air chamber passageway; and placing a sealing ring against said rotary interface and between said air chamber passageway and said annular recess; said sealing ring having a plurality of circumferentially spaced air ports for delivering air from said stationary air chamber member to said actuator member of said drive unit.

* * * * *